United States Patent
Krikorian et al.

(10) Patent No.: US 9,902,335 B2
(45) Date of Patent: Feb. 27, 2018

(54) ADJUSTABLE SUPPORT ASSEMBLIES FOR PORTABLE ELECTRONIC DEVICES

(71) Applicant: Zodiac Seats US LLC, Gainesville, TX (US)

(72) Inventors: Aram Krikorian, Ladera Ranch, CA (US); Raul Daniel Flores Aguirre, Chih (MX); Maria Fernanda Molinar Gutierrez, Chih (MX); Juan Hernandez, Chih (MX); Oscar Ruiz Lara, Chih (MX); John Allen, Sanger, TX (US); Merardo Vela Hinojos, Chih (MX)

(73) Assignee: Zodiac Seats US LLC, Gainesville, TX (US)

( * ) Notice: Subject to any disclaimer, the term of this patent is extended or adjusted under 35 U.S.C. 154(b) by 0 days.

(21) Appl. No.: 14/906,190

(22) PCT Filed: Jul. 21, 2014

(86) PCT No.: PCT/US2014/047436
§ 371 (c)(1),
(2) Date: Jan. 19, 2016

(87) PCT Pub. No.: WO2015/010123
PCT Pub. Date: Jan. 22, 2015

(65) Prior Publication Data
US 2016/0176356 A1 Jun. 23, 2016

Related U.S. Application Data

(60) Provisional application No. 61/856,315, filed on Jul. 19, 2013.

(51) Int. Cl.
*B60R 7/00* (2006.01)
*B60R 11/02* (2006.01)
(Continued)

(52) U.S. Cl.
CPC .............. *B60R 11/02* (2013.01); *B60N 3/004* (2013.01); *B60N 2002/4405* (2013.01);
(Continued)

(58) Field of Classification Search
CPC ........................ B60R 11/02; B60R 2011/0276
(Continued)

(56) References Cited

U.S. PATENT DOCUMENTS

| 6,360,083 B1 | 3/2002 | Fan |
| 6,418,010 B1 | 7/2002 | Sawyer |

(Continued)

FOREIGN PATENT DOCUMENTS

| CN | 201329843 Y | 10/2009 |
| DE | 202013100414 U1 | 2/2013 |

(Continued)

OTHER PUBLICATIONS

Europe Application No. 14752682.6, Communication Pursuant to Article 94(3) EPC, dated Mar. 15, 2017.
(Continued)

*Primary Examiner* — Derek Battisti
(74) *Attorney, Agent, or Firm* — Kilpatrick Townsend & Stockton LLP; Dean W. Russell; Davidson G. Lucas

(57) ABSTRACT

Described are adjustable support assemblies that include a base (16), a support platform (14) elastically coupled to the base, and a slide bar (12) elastically coupled to a pair of tracks on the base, wherein the adjustable support assembly is positioned within a recess (62) of a passenger seat back (64) and at least partially surrounded by a shroud (72) so that only portions of the support platform and the slide bar extend through the shroud, wherein the adjustable support assembly is configured to securely hold portable electronic devices having a range of heights, widths, and thicknesses.

18 Claims, 16 Drawing Sheets

(51) Int. Cl.
  *B60N 3/00* (2006.01)
  *B60R 11/00* (2006.01)
  *B60N 2/44* (2006.01)
(52) U.S. Cl.
  CPC ............. *B60R 2011/0017* (2013.01); *B60R 2011/0071* (2013.01); *B60R 2011/0075* (2013.01)
(58) Field of Classification Search
  USPC ........................................................ 224/275
  See application file for complete search history.

(56) References Cited

U.S. PATENT DOCUMENTS

| | | | | |
|---|---|---|---|---|
| 8,833,716 | B2* | 9/2014 | Funk | F16M 13/02 |
| | | | | 248/309.1 |
| 2004/0212745 | A1* | 10/2004 | Chang | B60R 11/0235 |
| | | | | 348/837 |
| 2005/0103815 | A1* | 5/2005 | Lee | B60K 35/00 |
| | | | | 224/275 |
| 2008/0157574 | A1* | 7/2008 | LaRussa | B60N 2/4876 |
| | | | | 297/217.3 |
| 2011/0174926 | A1* | 7/2011 | Margis | B60N 2/4876 |
| | | | | 244/118.6 |
| 2011/0278885 | A1 | 11/2011 | Procter et al. | |
| 2012/0006870 | A1* | 1/2012 | Proctor | B60R 11/02 |
| | | | | 224/275 |
| 2012/0235001 | A1* | 9/2012 | Somuah | B60R 11/0235 |
| | | | | 248/287.1 |
| 2013/0119727 | A1* | 5/2013 | Lavelle | B60N 2/4876 |
| | | | | 297/217.3 |
| 2015/0034687 | A1* | 2/2015 | Terleski | B64D 11/0015 |
| | | | | 224/275 |

FOREIGN PATENT DOCUMENTS

| | | |
|---|---|---|
| DE | 202013101363 U1 | 5/2013 |
| FR | 2982218 A1 | 5/2013 |
| WO | 2007109703 A2 | 9/2007 |

OTHER PUBLICATIONS

Application No. PCT/US2014/047436, Search Report and Written Opinion dated Nov. 5, 2014.
International Patent Application No. PCT/US2014/047436, International Preliminary Report on Patentability dated Jan. 28, 2016.
China Patent Application No. 201480038060.0, Office Action (including translation) dated Feb. 27, 2017.
China Patent Application No. 2014800380600, Office Action dated Oct. 24, 2017, including English translation.

* cited by examiner

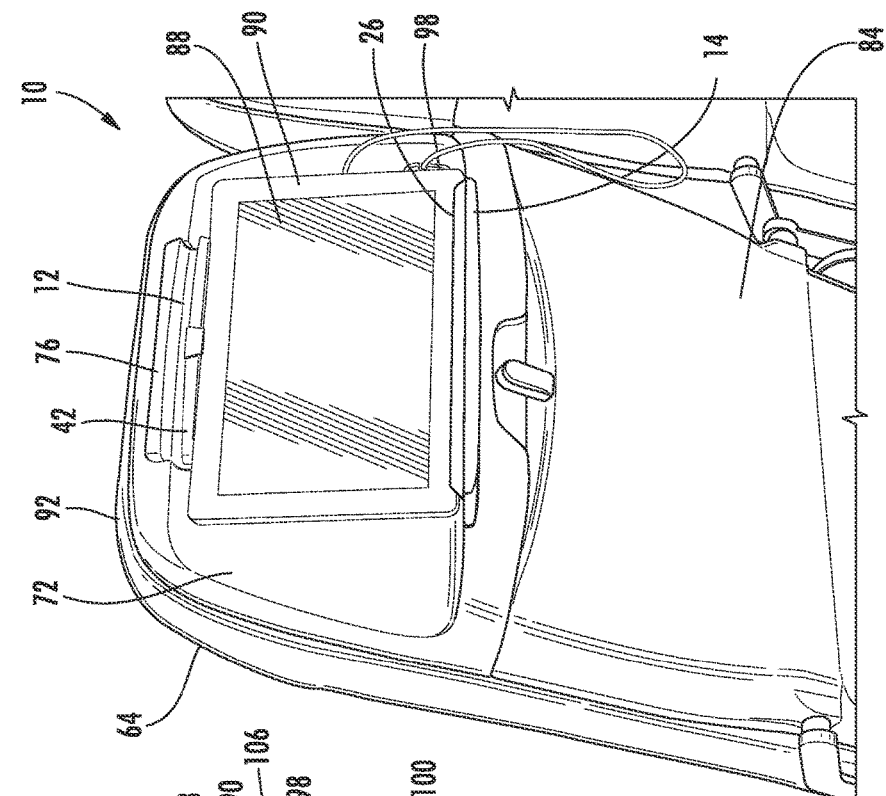
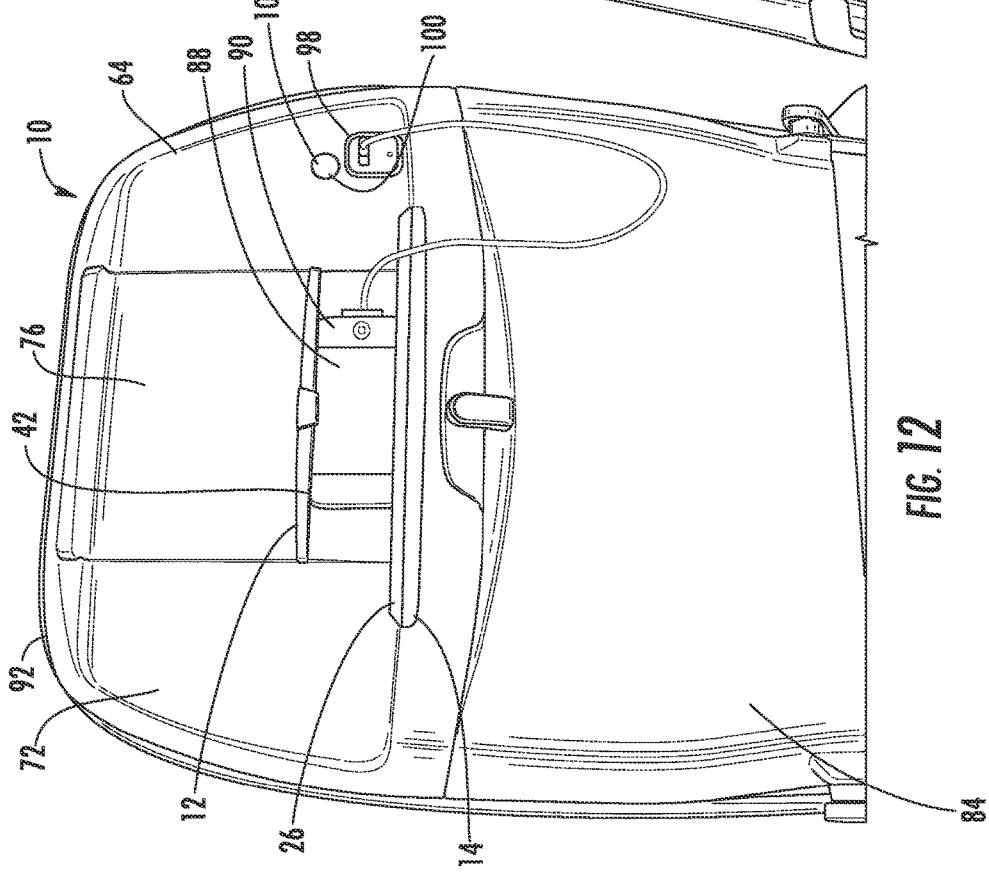

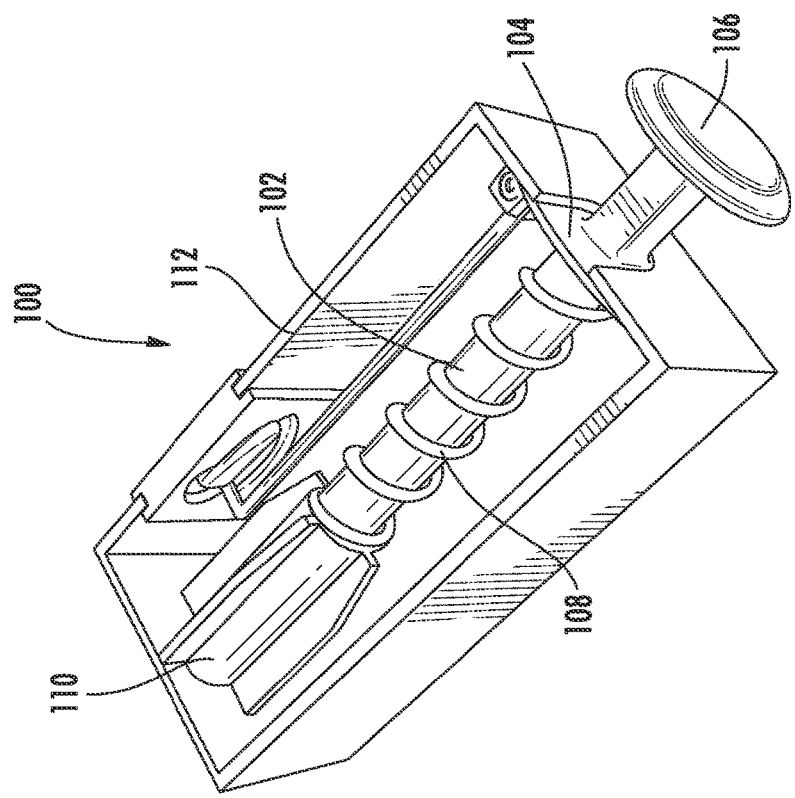
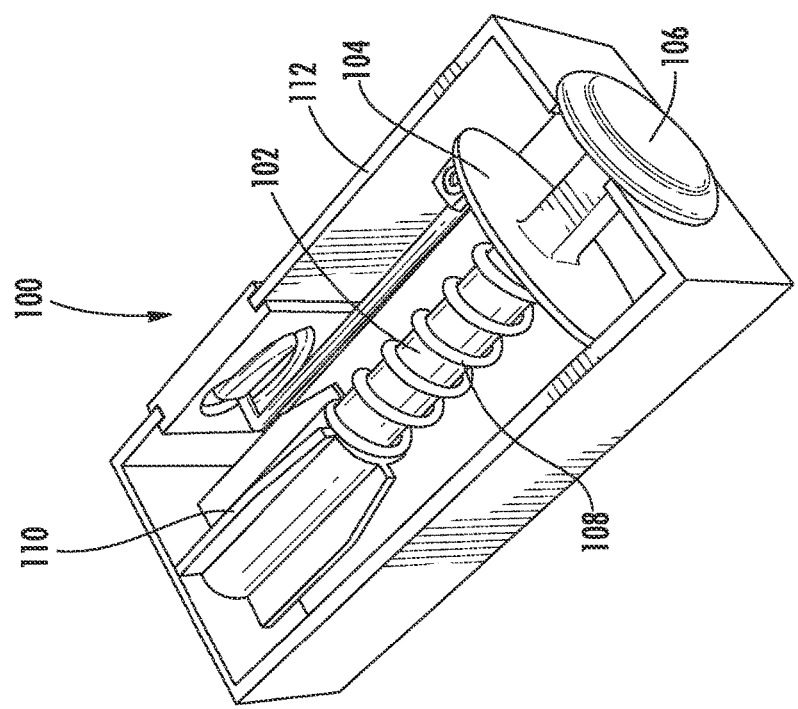

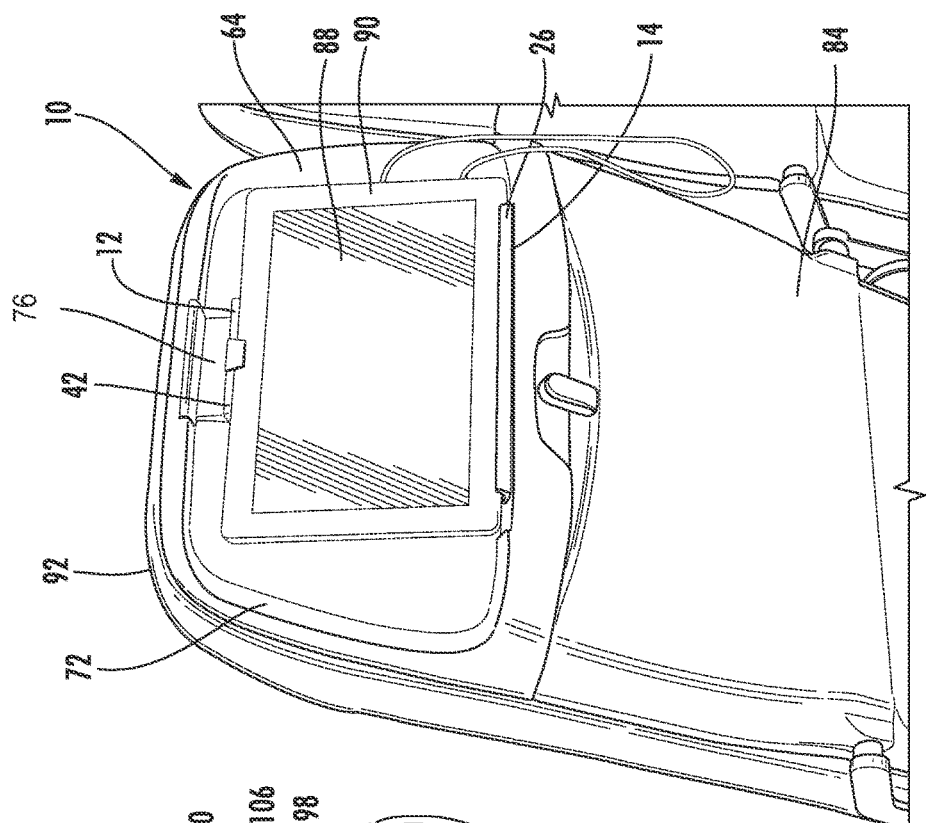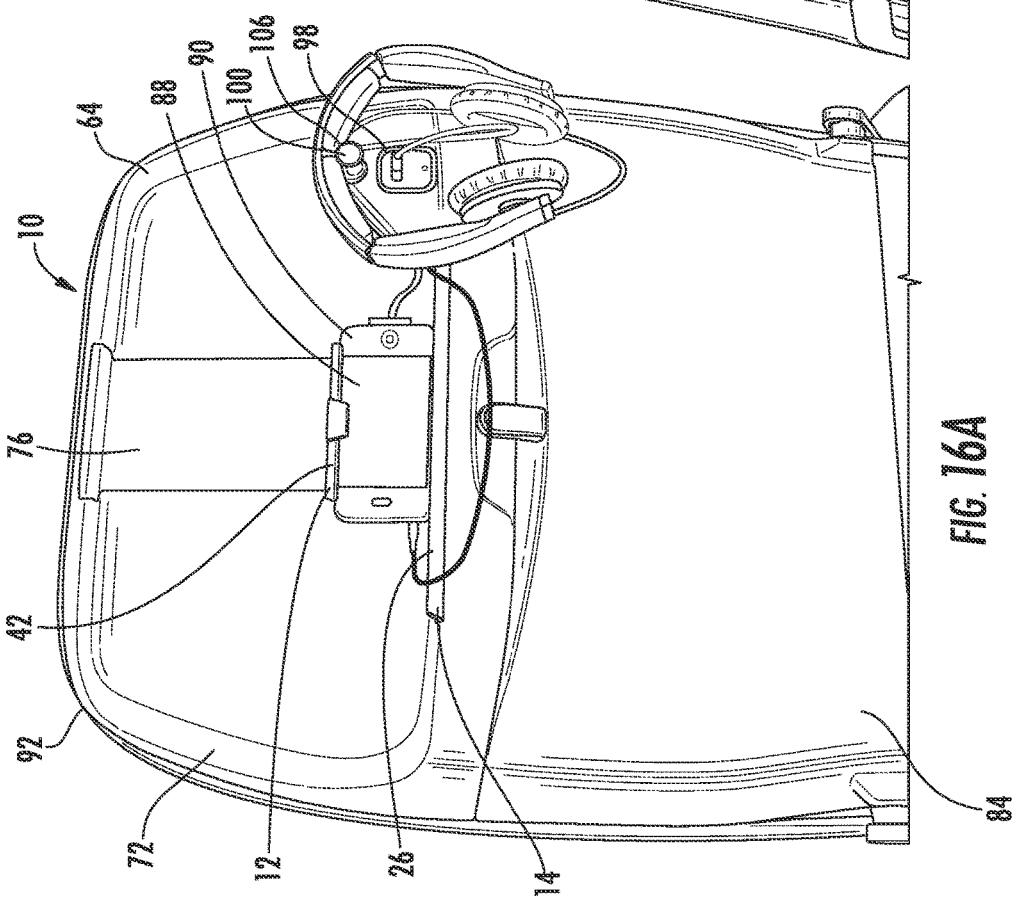

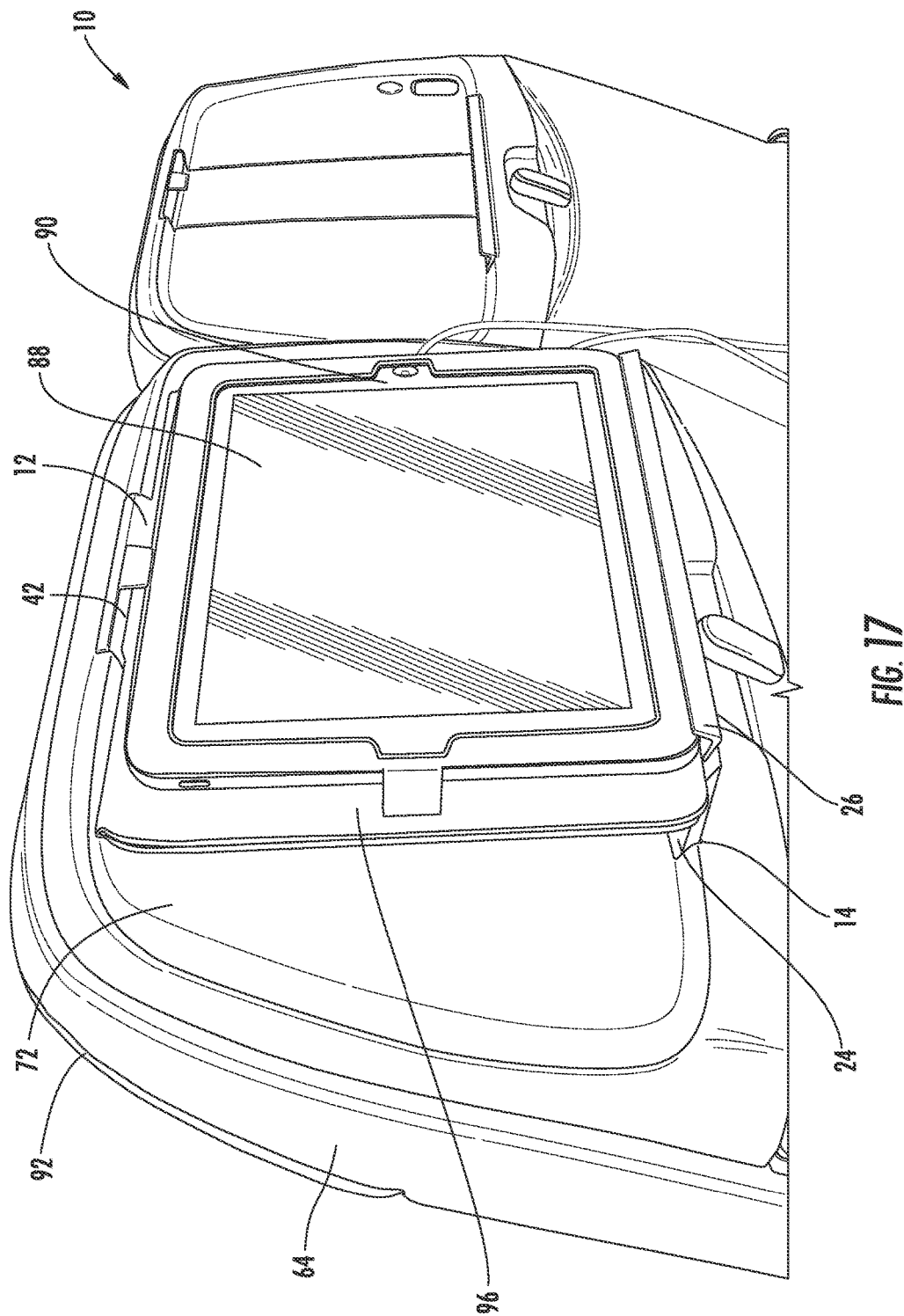

ADJUSTABLE SUPPORT ASSEMBLIES FOR PORTABLE ELECTRONIC DEVICES

CROSS REFERENCE TO RELATED APPLICATIONS

This application is the U.S. national phase entry of International Application Serial No. PCT/US2014/047436 ("the '436 application"), filed on Jul. 21, 2014, which application is related to and claims priority benefits from U.S. Provisional Application Ser. No. 61/856,315 ("the '315 application"), filed on Jul. 19, 2013, entitled Adjustable Support For Mobile Devices In Airplane Seats. The '436 and '315 applications are hereby incorporated in their entireties by this reference.

FIELD OF THE INVENTION

The invention relates to portable electronic device coupling assemblies for use with passenger seats or the like.

BACKGROUND

In many instances, passenger vehicles, such as aircraft, buses, trains, ships, and automobiles, include passenger seats with a wide assortment of portable electronic and entertainment options to encourage passengers to remain seated as much as possible during transport for safety, crew mobility, and to enable efficient cabin service. Some passenger seats may provide video and audio entertainment, including television, video games, internet access, and other on-board entertainment ("OBE") or in-flight entertainment ("IFE") components. Typically, these entertainment devices are mounted in the seat backs and arm rests of the passenger seats.

With the advent of portable electronic devices ("PEDs"), such as tablet computers, cell phones, smart phones, handheld video game systems, personal digital assistants, palmtop computers, DVD players, data and audio-video media, multi-media enabled devices, and other similar electronic devices, many passengers prefer to use their own PEDs, rather than the OBE or IFE components that are mounted in the passenger seats.

The rate at which PEDs, namely cell phones, portable computers, personal digital assistants ("PDAs"), have been evolving has been exponential. These devices are constantly increasing in functions and decreasing/altering in size, making them more portable and at the same time able to perform more tasks. This evolution has led to passengers carrying their personal information and media on these devices with the expectation of using them while traveling.

To this point, there have been very few examples of the integration of these PEDs into airplane seats in any specific way to the seat, other than providing a location on a tray table, such as a groove to hold the PED, and sometimes a power connection to charge them. Because the mounting location is in the tray table, which must be stowed during certain times during flight, there is still a need for passengers to have a way to "hold" or "store" these PEDs while in flight in a manner that allows the PEDs to be used and enjoyed at any given moment. Furthermore, when the mounting location is a groove, the design inherently limits the thickness of the PEDs that may be secured in that location based on the thickness of the groove. Also, by using the tray table to support the PED, it is not positioned at eye level, which generates discomfort after prolonged periods of time.

Other solutions to date involve attaching case (either provided by airlines or customer-purchased) to the backs of passenger seats as an add-on device. A drawback to this solution is that most cases are not adaptable to a large range of differing sizes and shapes of PEDs (e.g., a case for a cell phone often is not sized to accommodate a tablet or surface computer). For example, the cases offered by one airline can only hold iPads®, so other types of tablets or cellphones are not supported. An example of an improvement on conventional cases is shown in U.S. Publication No. 2011/0278885, wherein a cradle formed of multiple adjustable arms to support PEDs of varying sizes and shapes is configured to mount to a port within a passenger seat, and the connection between the cradle and the port also a power connection, and/or a communications connection to the OBE or IFE system and/or the internet to the PED.

When such cases are provided by the passengers, the passenger is able to ensure that the case will fit his or her device, but cannot be sure that the case will fit all types of passenger seats. As a result, the passenger may be forced to purchase an item that he or she may not be able to use on any other occasion. When provided by the airline, this solution creates the additional problem of having to carry on the plane a large amount of cases to provide for passengers, while also having to ensure that passengers will not take the holders with them after the flight.

In some cases, it may be desirable to provide a way for passengers to connect their PEDs to the OBE or IFE systems, so that they may use their own PEDs in lieu of the OBE or IFE systems. In other cases, it may be desirable to provide a way for passengers to connect their PEDs to the OBE or IFE systems to use in conjunction with the system's video display or to receive power for their PEDs or otherwise.

As a result, there is still a need for a support for PEDs that is always available and adaptable to a wide range of PED sizes, shapes, and thicknesses, and that does not create the need for an extra case or coupling assembly. Such a solution eliminates the need for airlines to provide a large number of cases, which represents additional weight and the need for additional storage space, as well as eliminating the costs for passengers to purchase an additional case for his or her PED. Such a solution also allows passengers to use their PEDs with or without a case, and to make the tray tables available for meals, documents, or any other object, or to allow passengers to stow the tray tables while still having the PEDs securely placed for use and/or viewing.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an adjustable support assembly comprises a base, a support platform comprising a ledge and a lip, wherein the ledge is elastically coupled to the base, and a slide bar a handle and a pair of arms, wherein the pair of arms are elastically coupled to a pair of tracks on the base, wherein the adjustable support assembly is positioned within a recess of a passenger seat back and at least partially surrounded by a shroud so that only portions of the support platform and the slide bar extend through the shroud.

In some embodiments, the adjustable support assembly is configured to securely hold portable electronic devices having a range of heights, widths, and thicknesses. The lip may be configured not to overlap a screen of the portable electronic device held by the adjustable support assembly and/or the lip may be transparent.

The pair of arms may be elastically coupled to the pair of tracks via spring-loaded fasteners that exert a force on the slide bar to pull the handle toward the shroud. Likewise, the ledge may be elastically coupled to the base via spring-loaded fasteners that exert a force on the support platform to pull the lip toward the shroud.

The adjustable support assembly may further comprise an electronic connection port positioned within the recess. The adjustable support assembly may also further comprise an accessory holder positioned within the recess.

According to certain embodiments of the present invention, an adjustable support assembly comprises a base, a support platform elastically coupled to the base, and a slide bar elastically coupled to a pair of tracks on the base, wherein the adjustable support assembly is positioned within a recess of a passenger seat back and at least partially surrounded by a shroud so that only portions of the support platform and the slide bar extend through the shroud, wherein the adjustable support assembly is configured to securely hold portable electronic devices having a range of heights, widths, and thicknesses.

The support platform may comprise a lip that is configured not to overlap a screen of the portable electronic device held by the adjustable support assembly. The support platform may also comprise a lip having a cutout design in the center that is configured to minimize the amount of overlap between the lip and a screen of the portable electronic device held by the adjustable support assembly. The support platform may further comprise a lip that is transparent.

The slide bar may be elastically coupled to the base via spring-loaded fasteners that exert a force on the slide bar to pull the slide bar toward the shroud. Likewise, the support platform may be elastically coupled to the base via spring-loaded fasteners that exert a force on the support platform to pull the support platform toward the shroud.

The adjustable support assembly may further comprise an electronic connection port positioned within the recess. The adjustable support assembly may also further comprise an accessory holder positioned within the recess.

Certain embodiments of the present invention may comprise retrofitting a passenger seat with an adjustable support assembly comprising a support platform and a slide bar, the method comprising removing a shroud from a passenger seat back to expose a recess within the passenger seat back, inserting the adjustable support assembly into the recess, coupling the adjustable support assembly to the recess, and installing a replacement shroud over the recess, wherein the replacement shroud at least partially surrounds the adjustable support assembly so that only portions of the support platform and the slide bar extend through the replacement shroud.

The retrofitting method may further comprise installing an electronic connection port within the recess prior to installing the replacement shroud. The retrofitting method may also further comprise installing an accessory holder within the recess prior to installing the replacement shroud.

In some embodiments, the adjustable support assembly is configured to securely hold portable electronic devices having a range of heights, widths, and thicknesses.

BRIEF DESCRIPTION OF THE DRAWINGS

FIG. 12 is a rear view of the adjustable support assembly of FIG. 1 with an electronic connection port and an accessory holder in use with a smaller portable electronic device.

FIG. 13 is a rear view of the adjustable support assembly of FIG. 1 in use with a larger portable electronic device.

FIGS. 15A and 15B are perspective view of the accessory holder of FIG. 12 in retracted and extended positions.

FIG. 16A is a rear view of the adjustable support assembly of FIG. 1 with an electronic connection port and an accessory holder in use with a smaller portable electronic device.

FIG. 16B is a rear view of the adjustable support assembly of FIG. 1 in use with a larger portable electronic device.

FIG. 17 is a rear view of the adjustable support assembly of FIG. 1 in use with a larger portable electronic device positioned within its cover.

DETAILED DESCRIPTION

Figure 1:
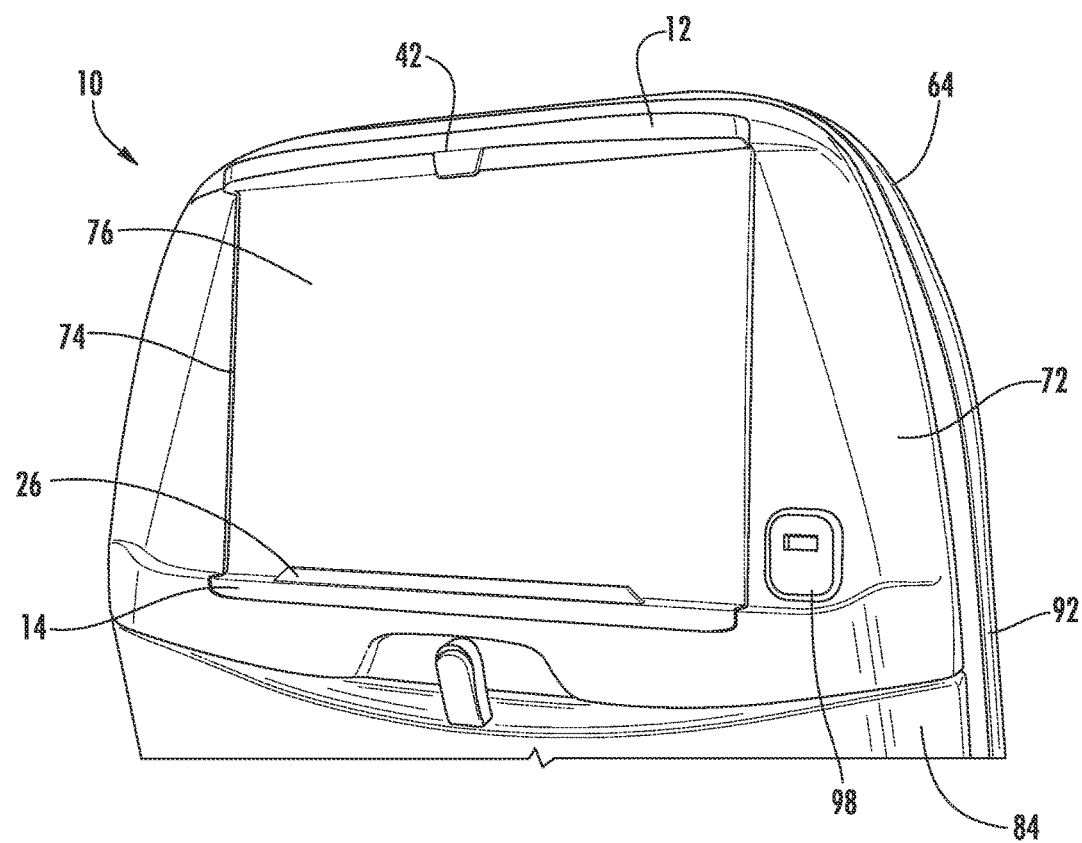
FIG. 1 is a perspective view of an adjustable support assembly mounted to a passenger seat, according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide adjustable support assemblies for PEDs for use with passenger seats. While the adjustable support assemblies are discussed for use with aircraft seats, they are by no means so limited. Rather, embodiments of the adjustable support assemblies may be used in passenger seats or other seats of any type or otherwise as desired.

FIGS. 1-17 illustrate embodiments of an adjustable support assembly 10. In these embodiments, the adjustable support assembly 10 comprises a slide bar 12, a support platform 14, and a base 16. The adjustable support assembly 10 may be formed of aluminum, stainless steel, polycarbonate, other metallic materials, composite materials, or other similar materials.

In certain embodiments, the base 16 may have a substantially planar overall shape. In other embodiments, such as those shown in FIGS. 2-3 and 7, the base 16 may comprise a pair of substantially co-planar portions 18 separated by an offset portion 20. In these embodiments, the offset portion 20 may be connected to each portion 18 via a side 22, wherein each side 22 extends between an edge of the offset portion 20 and an edge of the corresponding portion 18. The portions 18, offset portion 20, and sides 22 may be made of similar or different materials, and may be integrally formed from a single piece or unit or may be attached to one another via injection molding, adhesion, welding, or any suitable fasteners, which include but are not limited to screws, bolts, rivets or other mechanical or chemical fasteners.

Figure 2:
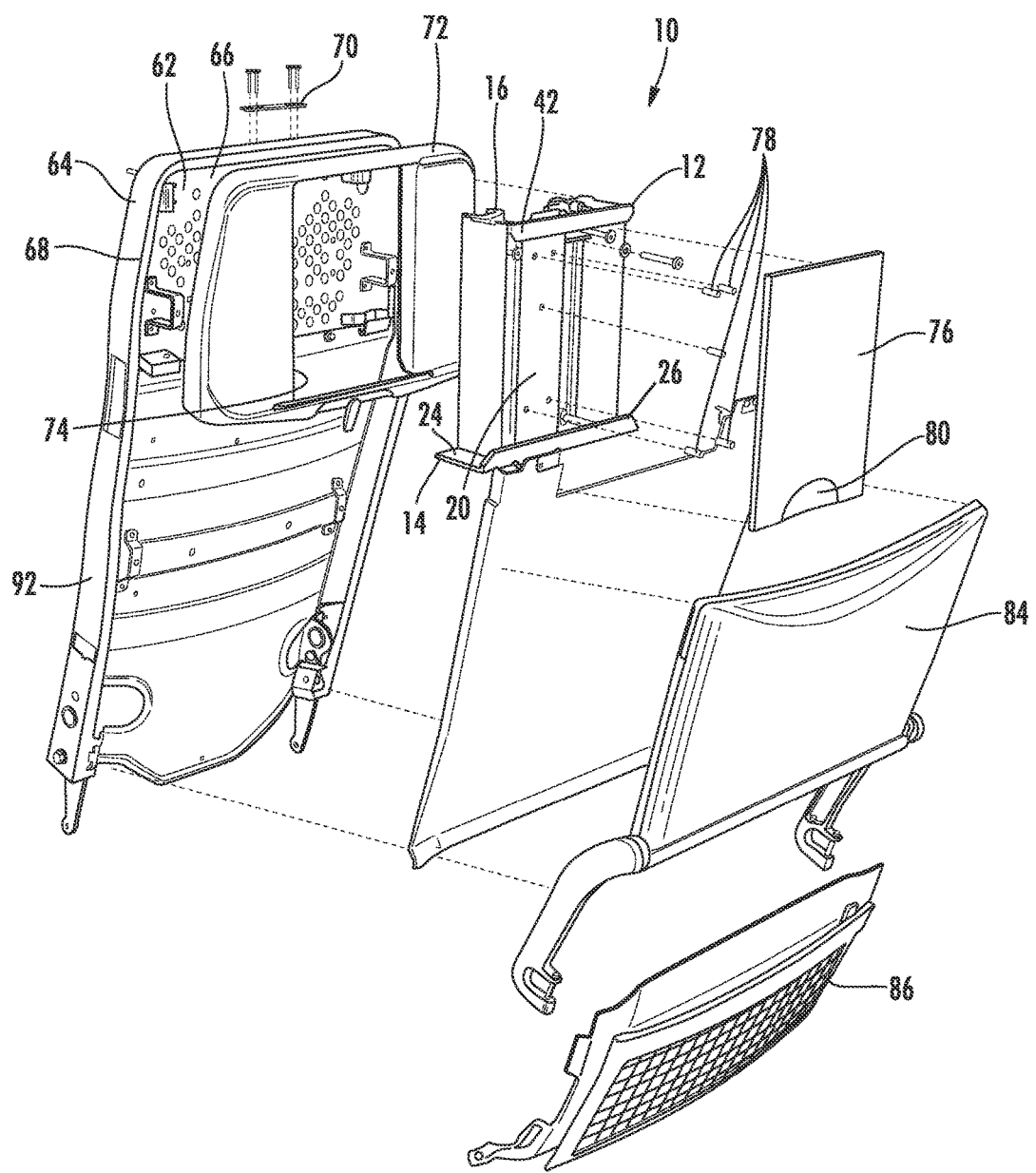
FIG. 2 is an exploded perspective view of the adjustable support assembly and passenger seat of FIG. 1.
Figure 3:
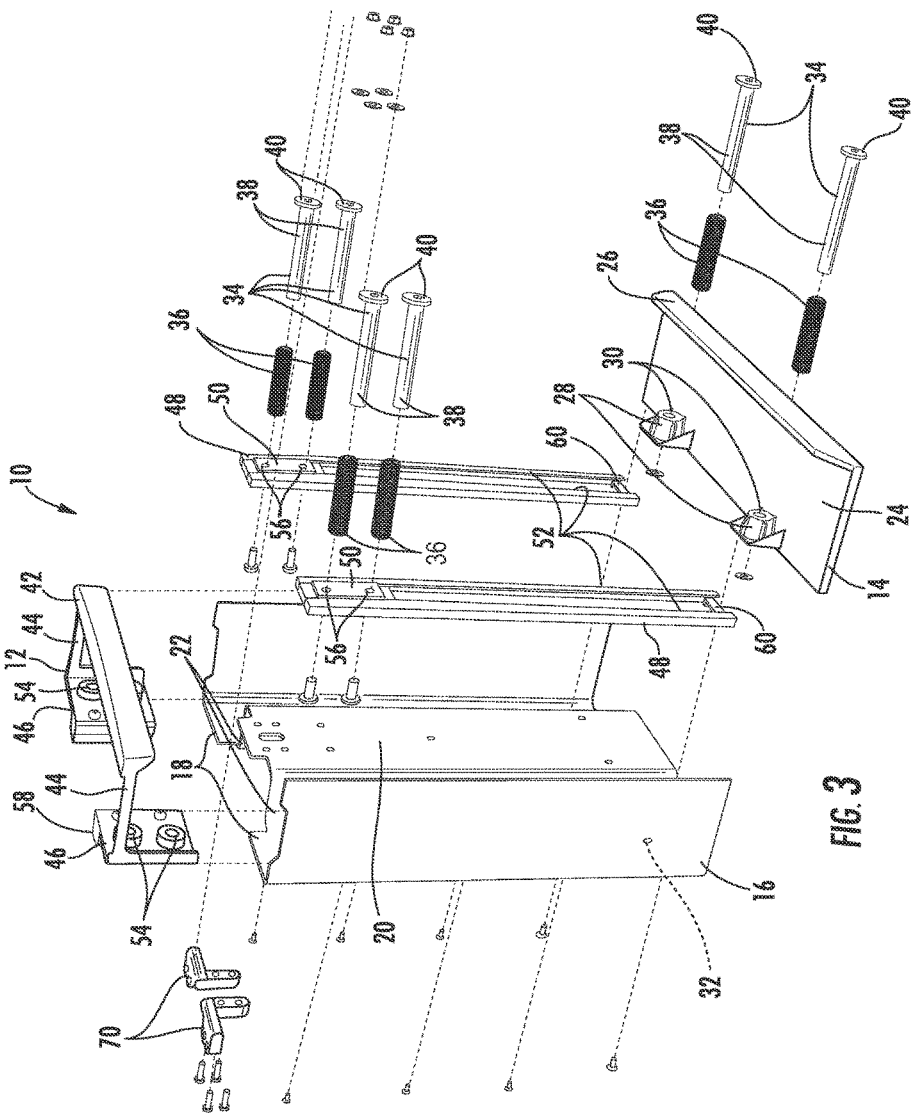
FIG. 3 is an exploded perspective view of the adjustable support assembly of FIG. 1.

As best illustrated in FIGS. 2-3, the support platform 14 may comprise a ledge 24 with an adjoining lip 26. The ledge 24 and the lip 26 may be made of similar or different materials, and may be integrally formed from a single piece or unit or may be attached to one another via injection molding, adhesion, welding, or any suitable fasteners, which include but are not limited to screws, bolts, rivets or other mechanical or chemical fasteners.

The ledge 24 of the support platform 14 may be coupled to a lower end of each portion 18. In some embodiments, the ledge 24 includes a pair of projections 28, each projection 28 having an aperture 30 passing therethrough. The projections 28 are positioned on the ledge 24 so that the apertures 30 substantially align with corresponding apertures 32 in the lower end of each portion 18 when the ledge 24 is positioned below the base 16. A fastener 34 is inserted through each pair of aligned apertures 30, 32 and secured, thereby coupling the support platform 14 to the base 16.

Figure 7:
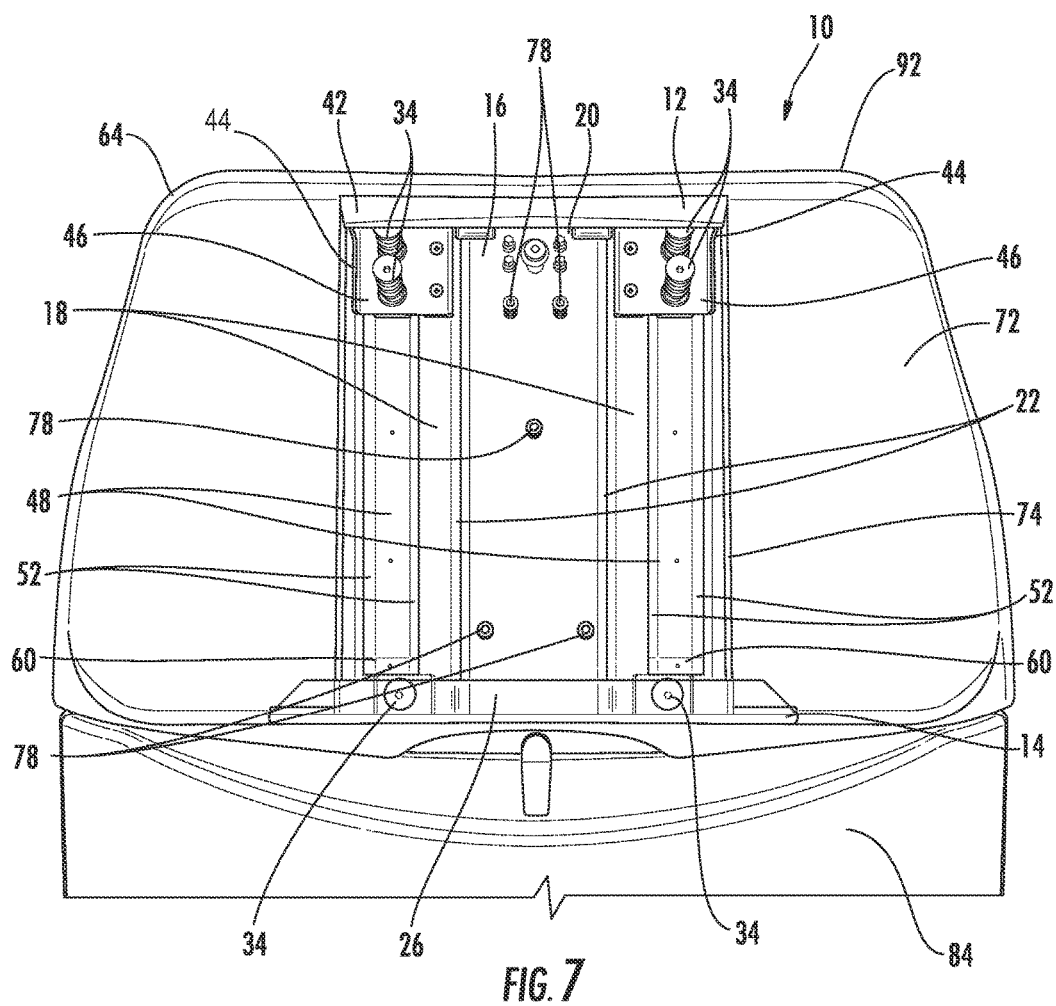
FIG. 7 is a rear view of the adjustable support assembly of FIG. 1 installed in the passenger seat without a cover.

In certain embodiments, the fasteners 34 are configured to allow the support platform 14 to translate relative to the base 16 while remaining fastened to the base 16. For example, in certain embodiments, a spring-loaded fastener 34, such as a shoulder bolt or barrel bolt, may be used where a spring 36 is positioned along a shaft 38 of the fastener 34 between a flange 40 of the fastener 34 and the projection 28. Each fastener 34 is sufficiently long to allow the support platform 14 to be pulled away from the base 16 a sufficient distance (which will be described in more detail below related to the stroke of the support platform 14), thereby compressing the spring 36. When the support platform 14 is released, the spring 36 partially decompresses, which pulls the support platform 14 back toward the base 16 to a stowed position. As illustrated in FIGS. 2-3 and 7, two such fasteners 34 are used to secure the support platform 14 to the base 16. However, a person of ordinary skill in the relevant art will understand that any suitable number and combination of fasteners 34 may be used to achieve the desired tension between the support platform 14 and the base 16.

In certain embodiments, as best illustrated in FIGS. 3 and 7, the slide bar 12 comprises a handle 42 that is connected at each end by a pair of arms 44 to a pair of coupling plates 46. The handle 42, arms 44, and/or coupling plates 46 may be made of similar or different materials, and may be integrally formed from a single piece or unit or may be attached to one another via injection molding, adhesion, welding, or any suitable fasteners, which include but are not limited to screws, bolts, rivets or other mechanical or chemical fasteners.

In certain embodiments, the slide bar 12 is slidingly coupled to the portions 18 of the base 16 via a pair of tracks 48 mounted to surfaces of the portions 18. Each track 48 may include a slider 50, which is inserted within the track 48 and retained therein by track lips 52. Each coupling plate 46 of the slide bar 12 comprises a pair of apertures 54, which are positioned so that the apertures 54 substantially align with corresponding apertures 56 in each slider 50 when the coupling plates 46 of the slide bar 12 are positioned proximate the sliders 50 in the tracks 48. A fastener 34 is inserted through each pair of aligned apertures 54, 56 and secured, thereby coupling the slide bar 12 to the base 16.

In certain embodiments, the fasteners 34 are configured to allow the slide bar 12 to translate relative to the sliders 50 while remaining fastened to the base 16. For example, in certain embodiments as described above with respect to the support platform 14, the spring-loaded fastener 34, such as a shoulder bolt or barrel bolt, may be used where the spring 36 is positioned along the shaft 38 of the fastener 34 between the flange 40 of the fastener 34 and an area of the coupling plate 46 surrounding the aperture 54. Each fastener 34 is sufficiently long to allow the slide bar 12 to be pulled away from the base 16 a sufficient distance (which will be described in more detail below related to the stroke of the slide bar 12), thereby compressing the spring 36. When the slide bar 12 is released, the spring 36 partially decompresses, which pulls the slide bar 12 back toward the sliders 50. As illustrated in FIGS. 2-3 and 7, four such fasteners 34 are used to secure the slide bar 12 to the base 16. However, a person of ordinary skill in the relevant art will understand that any suitable number and combination of fasteners 34 may be used to achieve the desired tension between the slide bar 12 and the sliders 50.

A pair of bumpers 58 may be coupled to an opposing side of each coupling plate 46. Each bumper 58 may be positioned so that it is positioned adjacent an edge of the track 48.

To avoid any interference with the support platform 14 when the slide bar 12 slides along the tracks 48, the tracks 48 may be configured so as to end above the location where the support platform 14 is coupled to the portions 18. To prevent the sliders 50 from exiting a lower end of each track 48, a carriage stopper 60 may be positioned within a lower end of each track 48.

The adjustable support assembly 10 may be positioned within a recess 62 formed in a passenger seat back 64. In certain embodiments, the recess 62 may be formed by a panel 66 having a perimeter least partially surrounded by a lip 68, wherein the three-dimensional shape of the recess 62 is formed by the panel 66 and the lip 68. The adjustable support assembly 10 is configured to fit within and couple to the recess 62. The adjustable support assembly 10 may be included when manufacturing new passenger seats 92 or may retrofitted into existing passenger seats 92.

In certain embodiments, the adjustable support assembly 10 may be coupled to the recess 62 via one or more friction hinges 70. The friction hinges 70 may be coupled at one end to an upper portion of the lip 68 and coupled at an opposite end to an upper end of the offset portion 20. However, a person of ordinary skill in the relevant art will understand that any suitable fasteners may be used to couple the adjustable support assembly 10 to the recess 62 in any suitable location.

In certain embodiments, a shroud 72 may be placed over at least a portion of a rear side of the passenger seat back 64 to at least partially enclose the recess 62 surrounding the adjustable support assembly 10. The shroud 72 may comprise an aperture 74 that is configured to allow at least a portion of the arms 44 of the slide bar 12 and at least a portion of the ledge 24 of the support platform 14 to extend through the aperture 74. In some embodiments, the ledge 24 of the support platform 14 may be wider than the distance between the arms 44. As a result, the aperture 74 may further include a substantially horizontal slot that corresponds to the height and width of the ledge 24, which may be wider than the portion of the aperture provided for at least a portion of the arms 44 of the slide bar 12 to pass through.

In certain embodiments, a cover 76 may be coupled to the offset portion 20 of the base 16. A plurality of spacers 78 may be positioned between the cover 76 and the offset portion 20 so as to ensure that the cover 76 is substantially flush with the shroud 72. The cover 76 may be configured to substantially fill the aperture 74 between the vertical travel path of the arms 44 such that the only open space remaining corresponds to the width of each arm 44 of the slide bar 12 and the vertical distance that each arm 44 travels along each track 48.

As a result, the adjustable support assembly 10 is almost completely embedded within the recess 62 of the passenger seat back 64, and only the handle 42 and the lip 26 being visible outside the shroud 72 and/or the cover 76 when the adjustable support assembly 10 is not in use, which gives the adjustable support assembly 10 a clean look that does not intrude into the passenger's space. In some embodiments, the cover 76 may include a recess 80, which is configured to provide access to the lip 26 of the support platform 14 when the lip 26 is positioned substantially flush against the shroud 72 and/or the cover 76.

In these embodiments where the adjustable support assembly 10 is configured to be held flush against an interior side of the shroud 72 inside the recess 62, the use of friction hinges 70 provide some flexibility in the coupling between the adjustable support assembly 10 and the recess 62. Such flexibility is particularly helpful where the surface of the shroud 72 may not be configured to be parallel to the panel 66 of the recess 62, resulting in a varying depth of the recess 62.

In certain embodiments, the offset portion 20 is spaced apart from the panel 66 by a distance that may approximate the depth of the recess 62. As a result, the three-dimensional shape formed by the offset portion 20 and the sides 22 may form a hollow enclosure between the panel 66 of the recess 62 and the adjustable support assembly 10. In certain embodiments, the hollow enclosure may be used to provide space for wiring, other mechanical components, or other items that need to be positioned between the panel 66 of the recess 62 and the adjustable support assembly 10.

As illustrated in FIG. 2, a tray table 84 and/or literature pocket 86 may be coupled to the passenger seat back 64 below the shroud 72.

Figure 8:
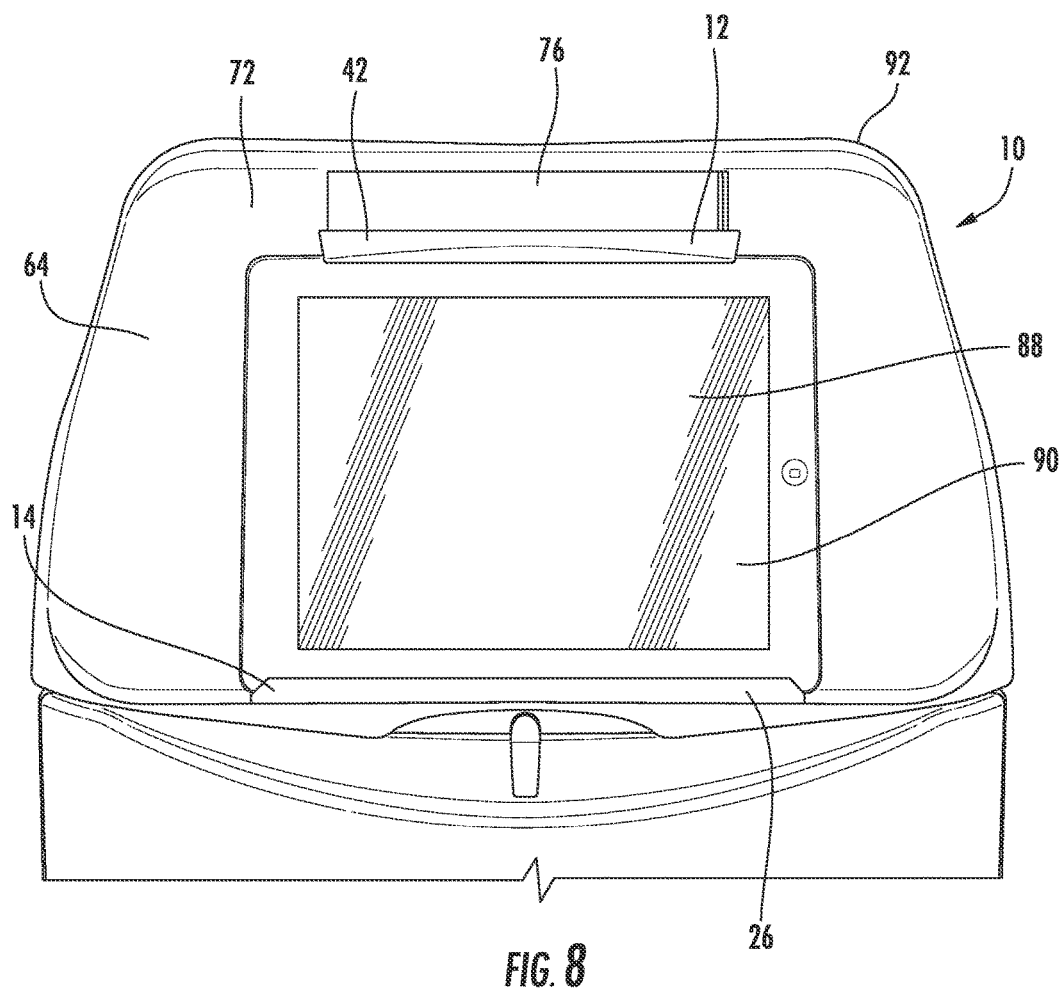
FIG. 8 is a rear view of the adjustable support assembly of FIG. 1 with a lower profile lip on the support platform.
Figure 9:
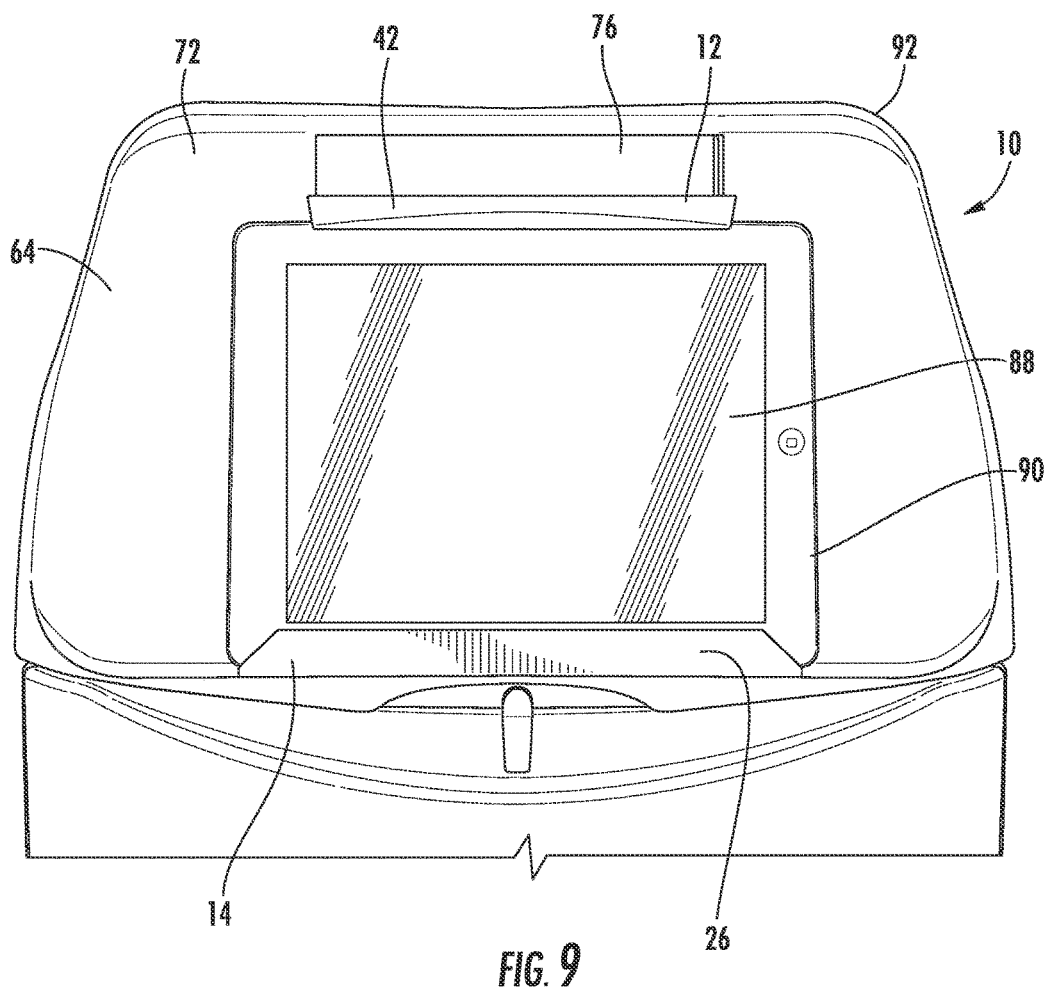
FIG. 9 is a rear view of the adjustable support assembly of FIG. 1 with a higher profile lip on the support platform.
Figure 10:
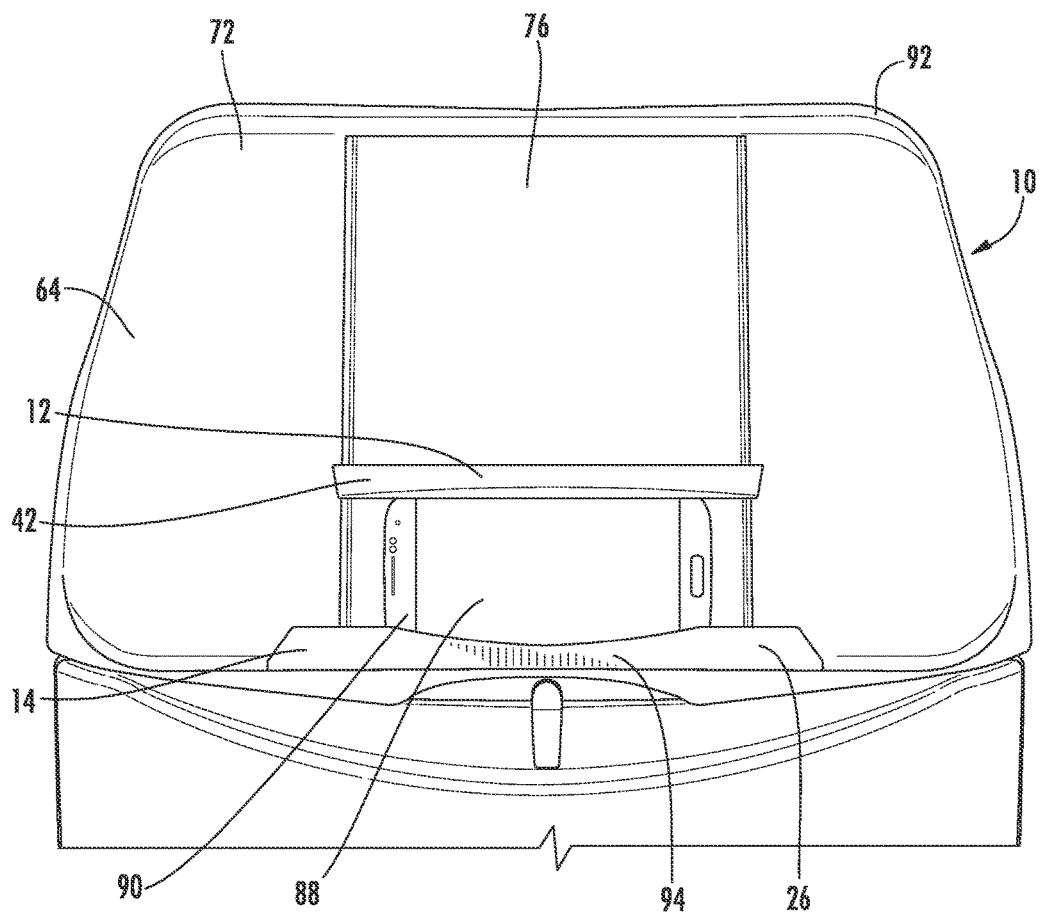
FIG. 10 is a rear view of the adjustable support assembly of FIG. 1 with a lip having a center cutout design on the support platform.
Figure 11:
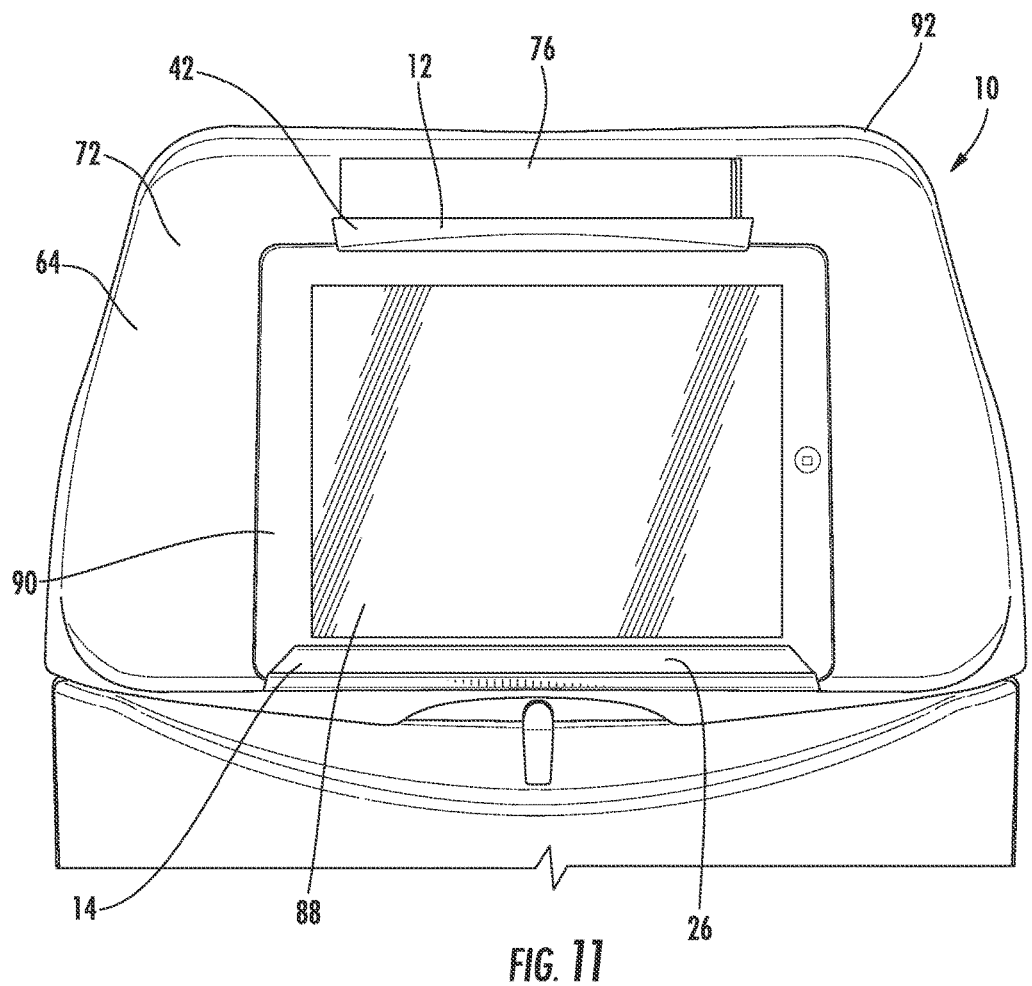
FIG. 11 is a rear view of the adjustable support assembly of FIG. 1 with a transparent lip on the support platform.

The lip 26 may have a variety of different configurations and may be formed of a variety of different materials, particularly as a key feature of the lip 26 (and the handle 42) is to not block or minimally block a screen 88 of a PED 90 or to form at least a portion of the lip 26 (and/or the handle 42) of a transparent material so that the screen 88 is visible through the lip (and/or the handle 42). FIGS. 7 and 11 shows a lip 26 formed of a transparent material. FIG. 8 shows a lip 26 with a lower profile so as to block less or none of the screen 88, even for smaller PEDs that may be placed in the adjustable support assembly 10. FIG. 9 shows a lip 26 with a higher profile that does not block the screen 88 of larger PEDs 90, but could interfere with the viewing of screens 88 on smaller PEDs 90 unless the lip 26 is formed of a transparent material (which is shown in FIG. 11). FIG. 10 shows a lip 26 with a higher profile on the ends that would only extend over the screens 88 of larger PEDs 90, but has a scooped or cutout design 94 in the center so as to minimize blocking of screens 88 of smaller PEDs 90.

Figure 4:
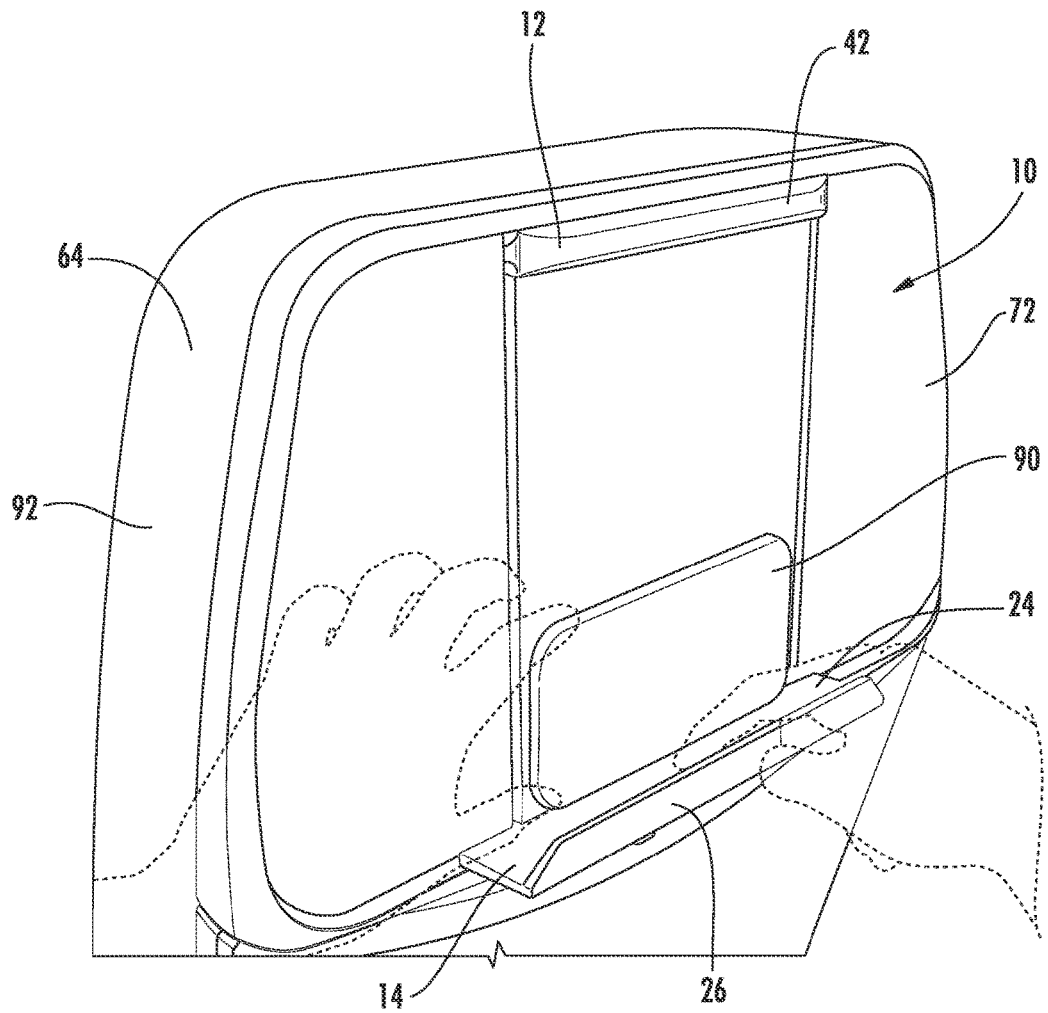
FIG. 4 is an image of a passenger placing an portable electronic device in a support platform of the adjustable support assembly of FIG. 1.

To use the adjustable support assembly 10, a passenger grasps the lip 26 of the support platform 14 with a first hand and pulls the support platform 14 away from the shroud 72 and/or the cover 76, as shown in FIG. 4. The passenger then places the PED 90 onto the ledge 24 behind the lip 26 with a second hand while continuing the grasp the lip 26 with the first hand. The passenger then releases the lip 26 while continuing to hold the PED 90 in place with the second hand. Once released, the support platform 14 slides back toward the shroud 72 and/or the cover 76 until the lip 26 presses the PED 90 against the shroud 72 and/or the cover 76.

Figure 5:
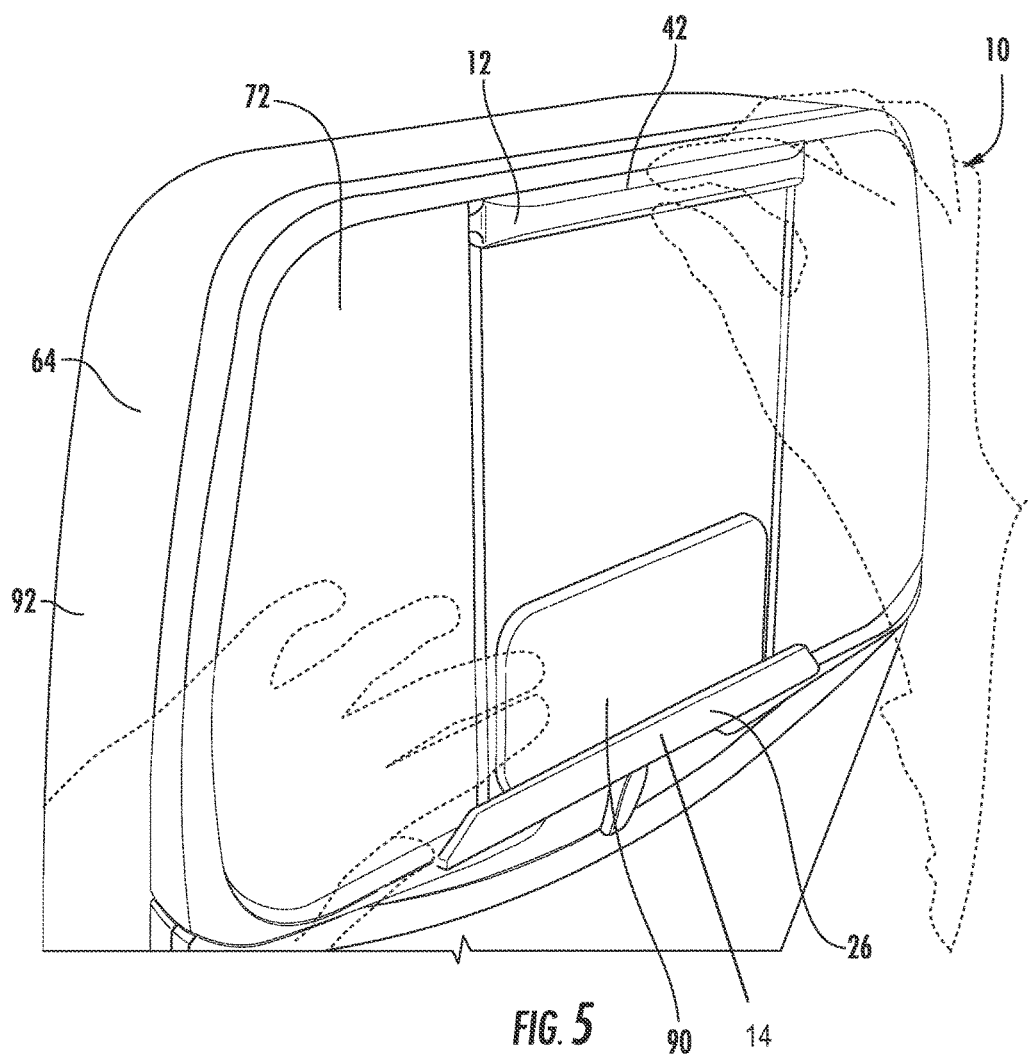
FIG. 5 is an image of a passenger pulling a slide bar of the adjustable support assembly of FIG. 1 after placing the portable electronic device in the support platform shown in FIG. 4.
Figure 6:
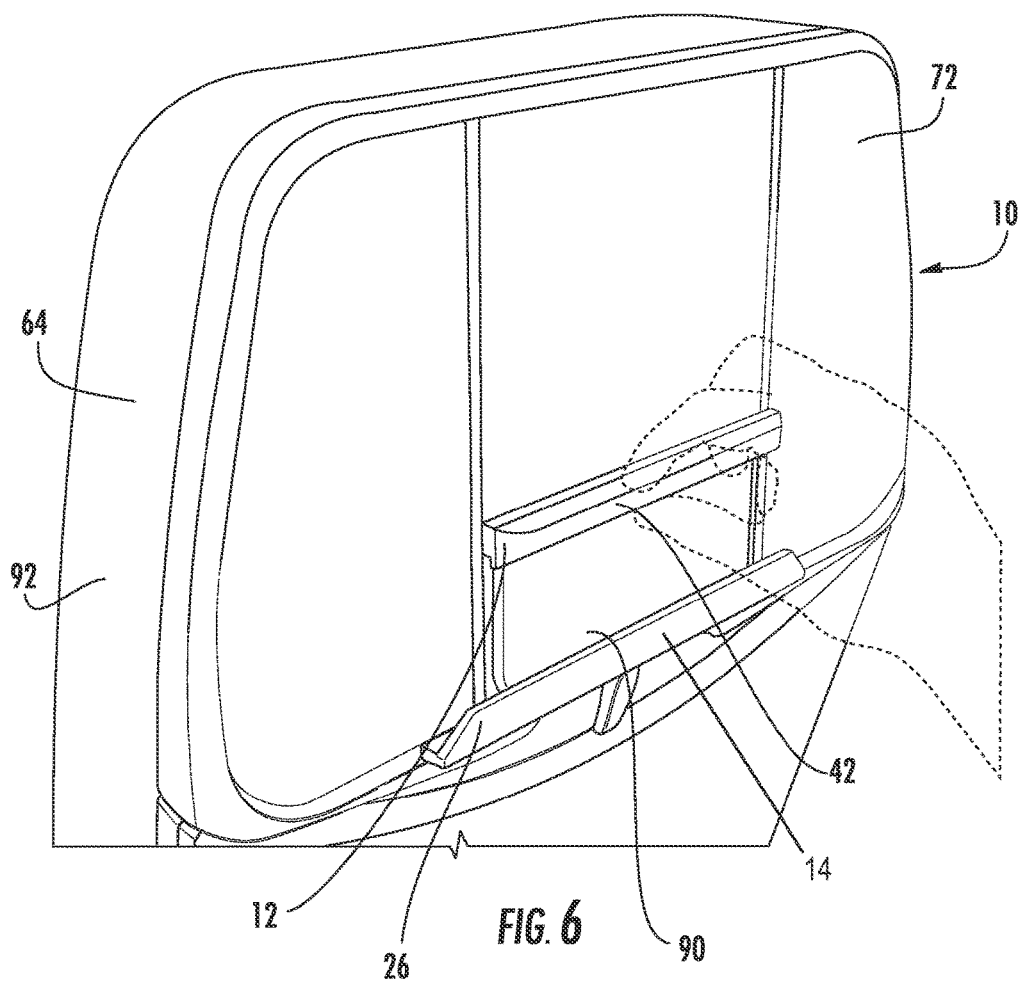
FIG. 6 is an image of a passenger lowering the slide bar of FIG. 5 over the portable electronic device.

Once the support platform 12 is in place against the PED 90, the passenger grasps the handle 42 of the slide bar 12 with the first hand and pulls the slide bar 12 away from the shroud 72 and/or the cover 76 while continuing to hold the PED 90 in place with the second hand, as shown in FIG. 5. The passenger then pulls the slide bar 12 down until the handle 42 is positioned over an opposing side of the PED 90, as shown in FIG. 6, and releases the handle 42. Once released, the slide bar 12 slides back toward the shroud 72 and/or the cover 76 until the handle 42 presses the PED 90 against the shroud 72 and/or the cover 76. The passenger then releases the PED 90.

Because the support platform 14 is elastically coupled to the base 16 via the spring-loaded fasteners 34, the support platform 14 applies a pressure to the PED 90 to hold the PED 90 in place against the shroud 72 and/or the cover 76. Likewise, because the slide bar 12 is elastically coupled to the tracks 48 of the base 16 via the spring-loaded fasteners 34, the slide bar 12 also applies a pressure to the PED 90 to hold the PED 90 in place against the shroud 72 and/or the cover 76. In addition, the slide bar 12 is vertically held in place along tracks 48 by the pressure exerted by the spring-loaded fasteners 34 so that the slide bar 12 cannot be vertically moved along the tracks 48 until the slide bar 12 is pulled away from the shroud 72 and/or the cover 76.

As best illustrated in FIGS. 12-13 and 16A-16B, the adjustable support assembly 10 is able to securely hold substantially any width of PEDs 90 (although widths that extend into the aisle or other passenger's space are likely to be impractical) and any height of PEDs 90 that do not exceed the length of the tracks 48.

The adjustable support assembly 10 can also securely hold any thickness of PEDs 90 that does not exceed the length of the stroke of the spring-loaded fasteners 34. For example, the range of thicknesses of PEDs is determined by the difference in length of the spring 36 in its partially compressed state when the slide bar 12 and support platform 14 are flush with the shroud 72 and/or cover 76 and when the spring 36 is fully compressed between the flange 40 and the projection 28 (in the case of the support platform 14) or between the flange 40 and the area of the coupling plate 46 surrounding the aperture 54 (in the case of the slide bar 12). By being able to accommodate a range of thicknesses, the adjustable support assembly 10 can, in addition to holding PEDs 90 with a range of thicknesses, also hold PEDs 90 within their covers 96, as illustrated in FIG. 17.

In addition to providing a mounting location, as shown in FIGS. 1 and 12-14, 16A-16B, and 17, an electronic connection port 98 may be positioned within the recess 80 for use with the PED 90 being held by the adjustable support assembly 10. The connection port 98 is accessible through the shroud 72. The connection port 98 may be a USB port that is connected to the electrical and or communications system of the vehicle so as to provide power and/or access to an OBE or IFE system and/or access to the internet.

Figure 14:
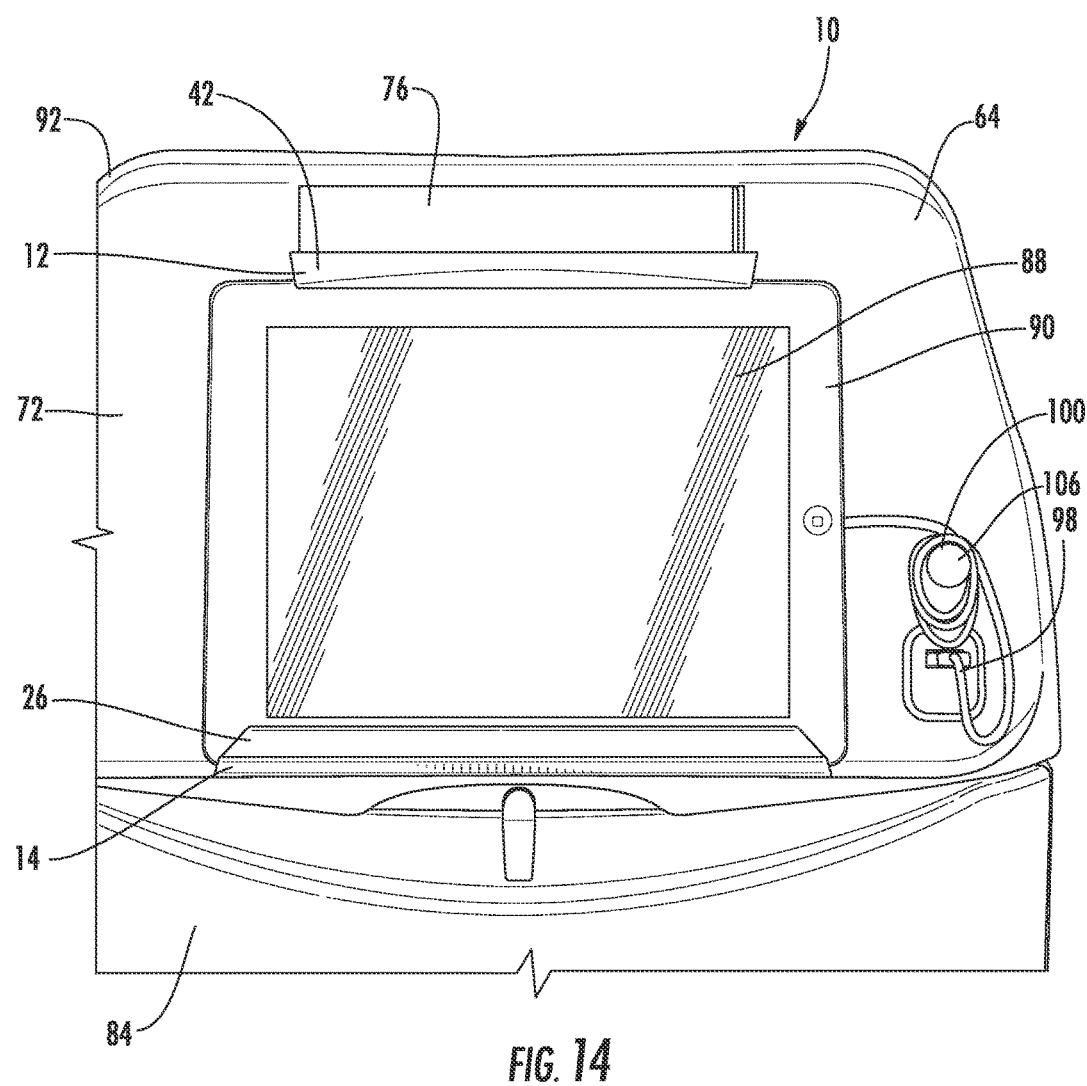
FIG. 14 is a rear view of the adjustable support assembly of FIG. 1 with an electronic connection port and an accessory holder in use with a larger portable electronic device.

As best illustrated in FIGS. 12-14, the adjustable support assembly 10 may further comprise an accessory holder 100, which may also be may be positioned within the recess 80 and accessible through the shroud 72. As illustrated in FIGS. 15A-15B, the accessory holder 100 comprises a shaft 102 with a first flange 104 and a second flange 106. A spring 108 is positioned between an end of the shaft 102 and the first flange 104. When the spring 108 is in a substantially relaxed state, the shaft 102 is partially pulled into a receptacle 110, which pulls the second flange 106 substantially flush against a box 112 surrounding the shaft 102, the first flange 104, and the receptacle 110. When the second flange 106 is pulled away from the box 112, the spring 108 is stretched, which then exerts a force on the shaft 102 to pull the second flange 106 back toward the box 112 when released.

When mounted in the recess 80, the accessory holder 100 is positioned so that the second flange 106 protrudes through an aperture in the shroud 72. To use the accessory holder 100, the passenger pulls the second flange 106 away from the shroud 72 and positions the accessory (power cord, headphones, etc.) over and/or around the exposed shaft 102. The passenger then releases the second flange 106, and the second flange 106 is pulled toward the shroud 72 until the second flange 106 presses against the accessory wrapped over and/or around the shaft 102.

The adjustable support assembly 10 may be retrofitted onto existing passenger seats 92 by removing the existing upper and lower shrouds from the passenger seat back 64 to expose the recess 62, inserting the adjustable support assembly 10 into the recess 62 in the passenger seat back 64, coupling the adjustable support assembly 10 to the upper side of the lip 68, installing the replacement shroud 72 over the recess 62, installing the lower shroud, the tray table 84, and the literature pocket 86 (if applicable). In some embodiments, the passenger seat 92 may also be retrofitted with the electronic connection port 98 and/or the accessory holder 100. In such cases, the replacement shroud 72 will also include apertures to access the electronic connection port 98 and/or the accessory holder 100.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An adjustable support assembly comprising: a base; a support platform comprising a ledge and a lip, wherein the support platform is elastically coupled to the base; and a slide bar comprising a handle and a pair of arms, wherein the pair of arms are elastically coupled to a pair of tracks on the base; wherein the adjustable support assembly is positioned within a recess of a passenger seat back and at least partially surrounded by a shroud so that only portions of the support platform and the slide bar extend through the shroud; wherein the support platform is elastically coupled to the base such that the support platform translates relative to the base; and wherein the pair of arms are elastically coupled to the pair of tracks via spring-loaded fasteners that exert a force on the slide bar to pull the handle toward the shroud such that the handle translates (i) in a longitudinal direction of the pair of tracks and (ii) in an axial direction of the spring-loaded fasteners, wherein the axial direction of the spring-loaded fasteners is approximately perpendicular to the longitudinal direction of the pair of tracks.

2. The adjustable support assembly of claim 1, wherein the adjustable support assembly is configured to securely hold portable electronic devices having a range of heights, widths, and thicknesses.

3. The adjustable support assembly of claim 2, wherein the lip is configured not to overlap a screen of the portable electronic device held by the adjustable support assembly.

4. The adjustable support assembly of claim 1, wherein the lip is transparent.

5. The adjustable support assembly of claim 1, wherein the support platform is elastically coupled to the base via spring-loaded fasteners that exert a force on the support platform to pull the support platform toward the base in a linear direction that is approximately perpendicular to a longitudinal direction of the pair of tracks.

6. The adjustable support assembly of claim 1, further comprising an electronic connection port positioned within the recess.

7. The adjustable support assembly of claim 1, further comprising an accessory holder positioned within the recess.

8. An adjustable support assembly comprising: a base; a support platform elastically coupled to the base; and a slide bar elastically coupled to a pair of tracks on the base; wherein the adjustable support assembly is positioned within a recess of a passenger seat back and at least partially surrounded by a shroud so that only portions of the support platform and the slide bar extend through the shroud; wherein the support platform is elastically coupled to the base such that the support platform translates relative to the base in a direction that is non-parallel with a longitudinal direction of the pair of tracks; wherein the adjustable support assembly is configured to securely hold portable electronic devices having a range of heights, widths, and thicknesses; and wherein the slide bar is elastically coupled to the base via spring-loaded fasteners that exert a force on the slide bar to pull the slide bar toward the shroud such that the slide bar translates (i) parallel to the longitudinal direction of the pair of tracks and (ii) in an axial direction of the spring-loaded fasteners, wherein the axial direction of the spring-loaded fasteners is approximately perpendicular to the longitudinal direction of the pair of tracks.

9. The adjustable support assembly of claim 8, wherein the support platform comprises a lip that is configured not to overlap a screen of the portable electronic device held by the adjustable support assembly.

10. The adjustable support assembly of claim 8, wherein the support platform comprises a lip having a cutout design in the center that is configured to minimize the amount of overlap between the lip and a screen of the portable electronic device held by the adjustable support assembly.

11. The adjustable support assembly of claim 8, wherein the support platform comprises a lip that is transparent.

12. The adjustable support assembly of claim 8, wherein the support platform is elastically coupled to the base via spring-loaded fasteners that exert a force on the support platform to pull the support platform in an axial direction of the spring-loaded fasteners, wherein the axial direction of the spring-loaded fasteners is approximately perpendicular to the longitudinal direction of the pair of tracks.

13. The adjustable support assembly of claim 8, further comprising an electronic connection port positioned within the recess.

14. The adjustable support assembly of claim 8, further comprising an accessory holder positioned within the recess.

15. Retrofitting a passenger seat with an adjustable support assembly comprising a support platform and a slide bar, the method comprising: removing a shroud from a passenger seat back to expose a recess within the passenger seat back; inserting the adjustable support assembly into the recess; coupling the adjustable support assembly to the recess; and installing a replacement shroud over the recess, wherein the replacement shroud at least partially surrounds the adjustable support assembly so that only portions of the support platform and the slide bar extend through the replacement shroud; wherein the support platform is coupled to the passenger seat such that the support platform translates relative to the passenger seat in a direction that is approximately perpendicular to an external surface of the passenger seat; and wherein the slide bar comprises a pair of arms that are elastically coupled to a pair of tracks via spring-loaded fasteners that exert a force on the slide bar to pull a handle toward the replacement shroud such that the handle translates (i) in a longitudinal direction of the pair of tracks and (ii) in an axial direction of the spring-loaded fasteners, wherein the axial direction of the spring-loaded fasteners is approximately perpendicular to the longitudinal direction of the pair of tracks.

16. The adjustable support assembly of claim 15, wherein the adjustable support assembly is configured to securely hold portable electronic devices having a range of heights, widths, and thicknesses.

17. The adjustable support assembly of claim 15, further comprising installing an electronic connection port within the recess prior to installing the replacement shroud.

18. The adjustable support assembly of claim 15, further comprising installing an accessory holder within the recess prior to installing the replacement shroud.

* * * * *